United States Patent
Abad et al.

(10) Patent No.: US 12,428,552 B2
(45) Date of Patent: Sep. 30, 2025

(54) POLYMERIC COMPOSITION COMPRISING A THERMOPLASTIC ELASTOMER WITH BUTADIENE AND STYRENE BLOCKS AND A COMPATIBLE PLASTICIZER

(71) Applicant: COMPAGNIE GENERALE DES ETABLISSEMENTS MICHELIN, Clermont-Ferrand (FR)

(72) Inventors: Mathilde Abad, Clermont-Ferrand (FR); Nathalie Coste, Clermont-Ferrand (FR); Guillaume Espy, Clermont-Ferrand (FR); Severin Dronet, Clermont-Ferrand (FR); Kahina Mammeri, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1101 days.

(21) Appl. No.: 17/418,151

(22) PCT Filed: Dec. 24, 2019

(86) PCT No.: PCT/EP2019/087008
§ 371 (c)(1),
(2) Date: Jun. 24, 2021

(87) PCT Pub. No.: WO2020/136194
PCT Pub. Date: Jul. 2, 2020

(65) Prior Publication Data
US 2022/0098402 A1    Mar. 31, 2022

(30) Foreign Application Priority Data
Dec. 26, 2018    (FR) ...................... 1874183

(51) Int. Cl.
| C08K 5/16 | (2006.01) |
| B60C 1/00 | (2006.01) |
| C08F 236/10 | (2006.01) |
| C08K 5/00 | (2006.01) |
| C08L 53/02 | (2006.01) |

(52) U.S. Cl.
CPC ............ C08L 53/02 (2013.01); B60C 1/0016 (2013.01); C08F 236/10 (2013.01); C08K 5/0016 (2013.01); C08L 2207/04 (2013.01)

(58) Field of Classification Search
CPC .... C08L 53/02; C08L 2207/04; B60C 1/0016; B60C 1/00; C08F 236/10; C08F 297/044; C08K 5/0016
See application file for complete search history.

(56) References Cited

U.S. PATENT DOCUMENTS

| 4,686,172 | A | * | 8/1987 | Worns | ...................... G03F 7/033 430/286.1 |
| 10,889,676 | B2 | | 1/2021 | Matmour et al. | |
| 2005/0004297 | A1 | | 1/2005 | Durel et al. | |
| 2019/0077900 | A1 | | 3/2019 | Matmour et al. | |

FOREIGN PATENT DOCUMENTS

| CN | 106814541 A * | 6/2017 |
| DE | 102016210267 A1 * | 12/2017 |
| FR | 3045615 A1 | 6/2017 |
| JP | 2007332246 A * | 12/2007 |
| WO | 03/016387 A1 | 2/2003 |

OTHER PUBLICATIONS

Product Data Sheet, downloaded on Nov. 13, 2024.*
Ouyang (C. Ouyang et al, Preparation and properties of styrene-butadiene-styrene copolymer/kaolinite clay compound and asphalt modified with the compound, Polymer Degradation and Stability 87 (2005) 309-317).*
International Search Report dated Mar. 18, 2020, in corresponding PCT/EP2019/087008 (4 pages).

* cited by examiner

Primary Examiner — Kumar R Bhushan
(74) Attorney, Agent, or Firm — VENABLE LLP

(57) ABSTRACT

A polymer composition comprises: a) at least one block thermoplastic elastomer comprising at least one elastomer block and at least one thermoplastic block, the elastomer block(s) predominantly comprising units derived from butadiene, the thermoplastic block(s) consisting of units derived from one or more styrene monomers, b) at least one plasticizer selected from butadiene oligomers with: b1) the molar content of 1,2-polybutadiene units in said plasticizer is within a range of from 70% to 130% of that in the elastomer block of the thermoplastic elastomer, and the molar mass of the plasticizer is greater than 1500 and less than 50 000 g/mol, or else b2) the molar content of 1,2-polybutadiene units in the plasticizer is less than 70%, or greater than 130%, of that in the elastomer block of the thermoplastic elastomer, and the molar mass of the plasticizer is greater than 4000 and less than 50 000 g/mol.

9 Claims, No Drawings

POLYMERIC COMPOSITION COMPRISING A THERMOPLASTIC ELASTOMER WITH BUTADIENE AND STYRENE BLOCKS AND A COMPATIBLE PLASTICIZER

BACKGROUND

The present invention relates to a polymer composition comprising a thermoplastic elastomer, the elastomer block(s) of which are predominantly butadiene block(s) and the thermoplastic block(s) of which are styrene block(s), and a plasticizer which is selective for the diene elastomer phase.

In a conventional tyre, the tread generally comprises, predominantly by weight, one or more diene elastomers.

A constant aim of tyre manufacturers is to improve the wet grip of tyres. At the same time, another aim is to reduce the rolling resistance of tyres. However, these two aims are difficult to reconcile in that the improvement in grip implies increasing the hysteresis losses whereas the improvement in the rolling resistance implies lowering the hysteresis losses. There is therefore a compromise in performance to be optimized.

For this purpose, the applicants have previously developed compositions for tyres comprising a thermoplastic elastomer. These tyres have a very good compromise in grip and rolling resistance performance.

Furthermore, the treads made of thermoplastic elastomers have an easier processing due to a low viscosity at temperature.

To further improve these tyres, the rigidity at ambient temperature of the treads must be able to be finely adjusted.

It is known to use plasticizers in combination with thermoplastic elastomers in order to adjust the rigidity of the composition. However, these plasticizers are not selective for the elastomer phase.

It is advantageous to have plasticizers that are selective for the diene elastomer phase. Indeed, these make it possible to shift the glass transition temperature of the elastomer phase (which influences the temperature positioning of the grip potential of the material) and to adjust the rigidity of the composition, without modifying the glass transition temperature of the thermoplastic phase of the thermoplastic elastomer (which controls the thermal resistance of the material, in particular for high-speed performance).

The applicants have discovered that the use of a specific plasticizer selected from butadiene oligomers as defined below in a polymer composition comprising a block thermoplastic elastomer comprising at least one elastomer block and at least one thermoplastic block, the elastomer block(s) predominantly comprising units derived from butadiene, the thermoplastic block(s) consisting of units derived from one or more styrene monomers, made it possible to obtain a selective effect of the plasticizer in the elastomer phase.

SUMMARY

Therefore, one subject of the invention is a polymer composition comprising
a) at least one block thermoplastic elastomer comprising at least one elastomer block and at least one thermoplastic block, the elastomer block(s) predominantly comprising units derived from butadiene, the thermoplastic block(s) consisting of units derived from one or more styrene monomers,
b) at least one plasticizer selected from butadiene oligomers, it being understood that:

b1) the molar content of 1,2-polybutadiene units in said plasticizer is within a range of from 70% to 130% of the molar content of 1,2-polybutadiene units in the elastomer block of the thermoplastic elastomer, and the molar mass of the plasticizer is greater than 1500 g/mol, preferably greater than 2000 g/mol, and less than 50 000 g/mol, or else b2) the molar content of 1,2-polybutadiene units in the plasticizer is less than 70%, or greater than 130%, of the molar content of 1,2-polybutadiene units in the elastomer block of the thermoplastic elastomer, and the molar mass of the plasticizer is greater than 4000 g/mol, preferably greater than 5000 g/mol, and less than 50 000 g.

DETAILED DESCRIPTION

In the present description, unless expressly indicated otherwise, all the percentages (%) indicated are percentages by weight.

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present application, the term "parts per hundred parts of elastomer" or "phr" is intended to mean the part by weight of a constituent per 100 parts by weight of the elastomer(s), i.e. of the total weight of the elastomer(s), whether they are thermoplastic or non-thermoplastic, in the composition. Thus, a constituent at 60 phr will mean, for example, 60 g of this constituent per 100 g of elastomer.

Thermoplastic elastomer (TPE) is understood to mean, in a known way, a polymer comprising a thermoplastic part and an elastomeric part.

A thermoplastic elastomer is a copolymer formed of one or more rigid "thermoplastic" blocks connected to one or more flexible "elastomer" blocks.

Thus, the thermoplastic elastomer(s) of the polymer composition of the tyre according to the invention comprise at least one elastomer block and at least one thermoplastic block.

Typically, each of these blocks contains at least more than 5, generally more than 10, repeat units.

In the present patent application, when reference is made to the glass transition temperature of a thermoplastic elastomer, it is the glass transition temperature relating to the elastomer block (unless otherwise indicated). This is because, in a known way, noncrystalline thermoplastic elastomers exhibit two glass transition temperature (Tg, measured according to ASTM D3418) peaks, the lowest temperature relating to the elastomer part of the thermoplastic elastomer and the highest temperature relating to the thermoplastic part of the thermoplastic elastomer. Thus, the flexible blocks of the thermoplastic elastomers, referred to as elastomer blocks, are generally defined by a Tg below or equal to ambient temperature (25° C.), while the rigid blocks, referred to as thermoplastic blocks, have a Tg above or equal to 80° C. In order to be both elastomeric and thermoplastic in nature, the thermoplastic elastomer has to be provided with blocks which are sufficiently incompatible (that is to say, different as a result of their respective weights, their respective polarities or their respective Tg values) to retain their own properties of elastomer block or thermoplastic block.

Thus, the thermoplastic elastomer(s) that can be used according to the invention (therefore the elastomer block(s) of the thermoplastic elastomers) preferentially have a glass transition temperature of the elastomer block(s) which is below or equal to 25° C., more preferentially below or equal to 10° C. A Tg value above these minima may reduce the performance of the tread during use at very low temperature; for such a use, the glass transition temperature of the thermoplastic elastomers is more preferentially still below or equal to −10° C.

Also preferentially, the glass transition temperature of the thermoplastic elastomers that can be used according to the invention is above −110° C.

The number-average molecular mass (denoted by Mn) of the thermoplastic elastomers is preferentially between 30 000 and 500 000 g/mol, more preferentially between 40 000 and 400 000 g/mol. Below the indicated minima, the cohesion between the elastomer chains of the thermoplastic elastomers, especially on account of their possible dilution (in the presence of an extender oil), runs the risk of being affected. Furthermore, an excessively high mass Mn can be detrimental to the processing. Thus, it has been found that a value between 50 000 and 300 000 g/mol was particularly well suited to use of the thermoplastic elastomers in a tyre tread.

The polydispersity index (PI=Mw/Mn, with Mw the weight-average molecular mass) of the thermoplastic elastomer(s) is preferably less than 3, more preferentially less than 2 and more preferentially still less than 1.5.

The thermoplastic elastomers that can be used according to the invention may be copolymers with a small number of blocks (less than 5, typically 2 or 3), in which case these blocks preferably have high masses of greater than 15 000 g/mol.

The thermoplastic elastomers may also be copolymers with a large number of smaller blocks (more than 30, typically from 50 to 500), in which case these blocks preferably have relatively low masses, for example from 500 to 5000 g/mol; these thermoplastic elastomers will subsequently be referred to as multiblock thermoplastic elastomers.

According to a first variant, the thermoplastic elastomers that can be used according to the invention are in a linear form.

In a first particular embodiment of this first variant, the thermoplastic elastomers are diblock copolymers: thermoplastic block/elastomer block.

In a second particular embodiment of this first variant, the thermoplastic elastomers are triblock copolymers: thermoplastic block/elastomer block/thermoplastic block, that is to say a central elastomer block and a terminal thermoplastic block at each of the two ends of the elastomer block.

In a third particular embodiment of this first variant, the thermoplastic elastomers are formed of an alternating linear series of elastomer blocks and thermoplastic blocks (multiblock thermoplastic elastomers).

According to a second variant, the thermoplastic elastomers which can be used according to the invention are provided in a star-branched form comprising at least three branches.

For example, the thermoplastic elastomers can then be composed of a star-branched elastomer block comprising at least three branches and of a thermoplastic block located at the end of each of the branches of the elastomer block. The number of branches of the central elastomer can vary, for example from 3 to 12 and preferably from 3 to 6.

According to a third variant, the thermoplastic elastomers which can be used according to the invention are provided in a branched or dendrimer form. The thermoplastic elastomers can then be composed of a branched or dendrimer elastomer block and of a thermoplastic block located at the end of the branches of the dendrimer elastomer block.

As explained above, the polymer composition according to the invention comprises at least one block thermoplastic elastomer comprising at least one elastomer block and at least one thermoplastic block.

The elastomer block(s) predominantly comprise units derived from butadiene.

In other words, each elastomer block comprises at least 50% by weight, preferably at least 70% by weight, of units derived from butadiene, relative to the weight of said elastomer block.

According to a first embodiment, each elastomer block comprises 100% by weight of units derived from butadiene, relative to the weight of said elastomer block.

According to a second embodiment, the butadiene used to form the elastomer block(s) can be copolymerized, in a random manner, with at least one other monomer so as to form an elastomer block predominantly comprising units derived from butadiene.

According to this variant, the molar fraction of polymerized monomer, other than butadiene, with respect to the total number of units of the elastomer block, has to be such that this block retains its elastomer properties. Advantageously, the molar fraction of this other comonomer can range from 0% to 50%, more preferentially from 0% to 45% and even more preferentially from 0% to 30%.

By way of illustration, this other monomer capable of copolymerizing with the first monomer may be selected from ethylenic monomers (for example ethylene), monomers of vinylaromatic type having from 8 to 20 carbon atoms as defined below, or else it may be a monomer such as vinyl acetate.

Styrene monomers are suitable in particular as vinylaromatic compounds.

As styrene monomers that can be used for the elastomer block(s), mention may be made of styrene, o-, m- or p-methylstyrene, alpha-methylstyrene, beta-methylstyrene, 2,6-dimethylstyrene, 2,4-dimethylstyrene, alpha-methyl-o-methylstyrene, alpha-methyl-m-methyl styrene, alpha-methyl-p-methyl styrene, beta-methyl-o-methyl styrene, beta-methyl-m-methylstyrene, beta-methyl-p-methylstyrene, 2,4,6-trimethylstyrene, alpha-methyl-2,6-dimethyl styrene, alpha-methyl-2,4-dimethyl styrene, beta-methyl-2,6-dimethylstyrene, beta-methyl-2,4-dimethylstyrene, o-, m- or p-chlorostyrene, 2,6-dichlorostyrene, 2,4-dichlorostyrene, alpha-chloro-o-chlorostyrene, alpha-chloro-m-chlorostyrene, alpha-chloro-p-chlorostyrene, beta-chloro-o-chlorostyrene, beta-chloro-m-chlorostyrene, beta-chloro-p-chlorostyrene, 2,4,6-trichlorostyrene, alpha-chloro-2,6-dichlorostyrene, alpha-chloro-2,4-dichlorostyrene, beta-chloro-2,6-dichlorostyrene, beta-chloro-2,4-dichlorostyrene, o-, m- or p-butylstyrene, o-, m- or p-methoxystyrene, o-, m- or p-chloromethylstyrene, o-, m- or p-bromomethylstyrene, and styrene derivatives substituted with a silyl group. The preferred styrene monomers are styrene and alpha-methylstyrene.

Thus, according to this second embodiment, the elastomer block(s) may further comprise units derived from one or more styrene monomers.

In this case, preferably, the units derived from styrene monomers in said elastomer block(s) represent 0 to 50% by weight of the elastomer block. Thus, according to this second embodiment, the at least one elastomer block may be a random copolymer of styrene-butadiene (SBR) type, it being possible for this copolymer to be hydrogenated. This SBR block preferably has a Tg (glass transition temperature) measured by DSC according to standard ASTM D3418, 1999, of below 25° C., preferentially below 10° C., more preferentially below 0° C. and very preferentially below −10° C. Also preferentially, the Tg of the SBR block is above −100° C. SBR blocks having a Tg of between 20° C. and −70° C., and more particularly between 0° C. and −50° C., are especially suitable. In a well known manner, the SBR block comprises a styrene content, a content of 1,2-units of the butadiene part and a content of 1,4-units of the butadiene part, the latter being composed of a content of trans-1,4-units and a content of cis-1,4-units when the butadiene part is not hydrogenated. Preferentially, use is made in particular of an SBR block having a styrene content, for example, within a range extending from 0% to 50% by weight, preferably from 0% to 30% by weight, and, for the butadiene part, a content of 1,2-bonds within a range extending from 0% to 90% (mol %) and a content of 1,4-bonds within a range extending from 0% to 90% (mol %).

Preferably for the invention, the elastomer blocks of the thermoplastic elastomers have, in total, a number-average molecular mass (Mn) ranging from 25 000 g/mol to 350 000 g/mol, preferably from 35 000 g/mol to 250 000 g/mol, so as to give the thermoplastic elastomers good elastomeric properties and a mechanical strength which is sufficient and compatible with the use as a tyre.

As explained above, the thermoplastic polymers that can be used according to the invention also comprise at least one thermoplastic block.

Thermoplastic block is understood to mean a block formed of polymerized monomers and having a glass transition temperature, or a melting point in the case of semicrystalline polymers, of greater than or equal to 80° C., preferably varying from 80° C. to 250° C., more preferentially varying from 80° C. to 200° C. and in particular varying from 80° C. to 180° C.

When the thermoplastic block is a semicrystalline polymer, a melting point may be observed which is above the glass transition temperature. In this case, the melting point and not the glass transition temperature is taken into account for the above definition.

The thermoplastic block(s) of the thermoplastic elastomer used according to the invention consist of units derived from one or more styrene monomers.

Preferably, the styrene monomer(s) of the thermoplastic block(s) are selected from styrene, o-, m- or p-methylstyrene, alpha-methylstyrene, beta-methylstyrene, 2,6-dimethylstyrene, 2,4-dimethylstyrene, alpha-methyl-o-methyl styrene, alpha-methyl-m-methyl styrene, alpha-methyl-p-methyl styrene, beta-methyl-o-methyl styrene, beta-methyl-m-methylstyrene, beta-methyl-p-methyl styrene, 2,4,6-trimethylstyrene, alpha-methyl-2,6-dimethyl styrene, alpha-methyl-2,4-dimethyl styrene, beta-methyl-2,6-dimethylstyrene, beta-methyl-2,4-dimethylstyrene, o-, m- or p-chlorostyrene, 2,6-dichlorostyrene, 2,4-dichlorostyrene, alpha-chloro-o-chlorostyrene, alpha-chloro-m-chlorostyrene, alpha-chloro-p-chlorostyrene, beta-chloro-o-chlorostyrene, beta-chloro-m-chlorostyrene, beta-chloro-p-chlorostyrene, 2,4,6-trichlorostyrene, alpha-chloro-2,6-dichlorostyrene, alpha-chloro-2,4-dichlorostyrene, beta-chloro-2,6-dichlorostyrene, beta-chloro-2,4-dichlorostyrene, o-, m- or p-butylstyrene, o-, m- or p-methoxystyrene, o-, m- or p-chloromethylstyrene, o-, m- or p-bromomethylstyrene, and styrene derivatives substituted with a silyl group.

According to a preferred embodiment, the thermoplastic block(s) predominantly comprise units derived from the alpha-methyl styrene monomer.

In other words, according to this embodiment, each thermoplastic block comprises at least 50% by weight, preferably at least 70% by weight, of units derived from the alpha-methylstyrene monomer.

More preferably, the thermoplastic block(s) consist of units derived from the alpha-methyl styrene monomer.

Preferably, the thermoplastic blocks of the thermoplastic elastomers have, in total, a number-average molecular mass ("Mn") ranging from 5000 g/mol to 150 000 g/mol.

The thermoplastic block(s) are preferentially present in sufficient proportions to preserve the thermoplastic nature of the thermoplastic elastomers which can be used according to the invention. The minimum content of thermoplastic blocks in the thermoplastic elastomers can vary as a function of the conditions of use of the thermoplastic elastomers.

On the other hand, the ability of the thermoplastic elastomers to deform during the preparation of the tyre can also contribute to determining the proportion of the thermoplastic blocks in the thermoplastic elastomers which can be used according to the invention.

Preferably, the thermoplastic block(s) consisting of units derived from one or more styrene monomers represent at most 35%, preferably from 10% to 35% by weight, relative to the weight of the thermoplastic elastomer.

The thermoplastic elastomer which can be used in the polymer composition of the tyre according to the invention generally represents from 15 to 100 phr of the polymer composition, preferably from 50 to 100 phr, more preferentially from 70 to 100 phr. The thermoplastic elastomer which can be used in the polymer composition according to the invention can be prepared by the synthesis process analogous to the one described in document FR 3 045 615.

The polymer composition according to the invention can also comprise one or more non-thermoplastic elastomers, such as diene elastomers well known to those skilled in the art.

"Diene" elastomer or rubber should be understood, in a known way, to mean an (one or more is understood) elastomer resulting at least in part (i.e., a homopolymer or a copolymer) from diene monomers (monomers bearing two conjugated or non-conjugated carbon-carbon double bonds).

Diene elastomer should be understood, according to the invention, as meaning any synthetic elastomer resulting, at least in part, from diene monomers. More particularly, diene elastomer is intended to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter contain from 20% to 99% by weight of diene units and from 1% to 80% by weight of vinylaromatic units. The following are especially suitable as conjugated dienes that can be used in the process in accordance with the invention: 1,3-butadiene, 2-methyl-1,3-butadiene, 2,3-di(Ci to C5 alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene or 2,4-hexadiene, etc.

The optionally present diene elastomer of the composition is preferentially selected from the group of diene elastomers consisting of polybutadienes (abbreviated to "BRs"), synthetic polyisoprenes (IRs), natural rubber (NR), butadiene copolymers, isoprene copolymers, copolymers of ethylene and of diene, and the mixtures of these polymers. Such copolymers are more preferentially selected from the group consisting of butadiene/styrene copolymers (SBRs), isoprene/butadiene copolymers (BIRs), isoprene/styrene copolymers (SIRs), isoprene/butadiene/styrene copolymers (SBIRs), halogenated or non-halogenated butyl rubbers, and copolymers of ethylene and of butadiene (EBRs).

Particularly preferably, the thermoplastic elastomer(s) that can be used according to the invention and described above are the only elastomers of the polymer composition of the tyre according to the invention.

As explained above, the polymer composition according to the invention comprises at least one plasticizer selected from butadiene oligomers, it being understood that:
  b1) the molar content of 1,2-polybutadiene units in said plasticizer is within a range of from 70% to 130% of the molar content of 1,2-polybutadiene units in the elastomer block of the thermoplastic elastomer, and
  the molar mass of the plasticizer is greater than 1500 g/mol, preferably greater than 2000 g/mol, and less than 50 000 g/mol,
  or else
  b2) the molar content of 1,2-polybutadiene units in the plasticizer is less than 70%, or greater than 130%, of the molar content of 1,2-polybutadiene units in the elastomer block of the thermoplastic elastomer, and
  the molar mass of the plasticizer is greater than 4000 g/mol, preferably greater than 5000 g/mol, and less than 50 000 g/mol.

Preferably, the plasticiser(s) represent from 5 to 50 phr, preferably from 5 to 30 phr, better still from 7 to 20 phr.

The polymer composition according to the invention may also comprise a crosslinking system.

Preferably, the crosslinking system is based on sulfur or on a sulfur donor.

The expression "crosslinking system based on" should be understood to mean that the crosslinking system comprises a mixture and/or the product of the reaction of the various constituents used in the crosslinking system, and in particular the sulfur or the sulfur donor, some of these base constituents being capable of reacting, or intended to react, at least in part, with one another or with the other constituents of the tyre during the various phases of manufacture of the tyre.

The crosslinking system can be a vulcanization system. In this case, it is preferentially based on sulfur or based on a sulfur donor and on a vulcanization accelerator, in particular a primary vulcanization accelerator.

Mention may be made, among sulfur donors, for example, of alkylphenol disulfides (APDSs), such as, for example, para-(tert-butyl)phenol disulfide.

Advantageously, the content of sulfur or sulfur donor is between 0.2 and 2 phr, preferably between 0.5 and 1.5 phr, more preferably between 0.5 and 1.4 phr.

Use may be made, as primary accelerator, of any compound capable of acting as accelerator for the vulcanization of diene elastomers in the presence of sulfur, in particular accelerators of the thiazole type and also derivatives thereof, or accelerators of thiuram or zinc dithiocarbamate type. These accelerators are more preferably selected from the group consisting of N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to "TBBS"), N-(tert-butyl)-2-benzothiazolesulfenimide (abbreviated to "TBSI"), zinc dibenzyldithiocarbamate (abbreviated to "ZBEC") and mixtures of these compounds.

Preferably, use is made of a primary accelerator of the sulfenamide type.

Particularly preferably, the primary vulcanization accelerator is N-cyclohexyl-2-benzothiazolesulfenamide (CBS).

According to one particular embodiment of the invention, the content of vulcanization accelerator(s) ranges from 0.2 to 10 phr, preferably ranges from 0.2 to 7 phr, more preferentially from 0.6 to 2 phr.

Advantageously, the sulfur or sulfur donor/vulcanization accelerator weight ratio ranges from 0.25 to 4.

Optionally added to this vulcanization system are various known secondary vulcanization accelerators or vulcanization activators, such as zinc oxide, stearic acid, guanidine derivatives (in particular diphenylguanidine), etc.

The polymer composition according to the invention may also comprise a reinforcing filler.

In particular, use may be made of any type of filler commonly used for the manufacture of tyres, for example an organic filler, such as carbon black, an inorganic filler, such as silica, or else a blend of these two types of filler, especially a blend of carbon black and silica.

Any carbon black conventionally used in tyres ("tyre-grade" black) is suitable as carbon black. Mention will more particularly be made, for example, of the reinforcing carbon blacks of the 100, 200 or 300 series (ASTI grades), such as, for example, the N115, N134, N234, N326, N330, N339, N347 or N375 blacks, or else, depending on the applications targeted, the blacks of higher series (for example N660, N683 or N772), indeed even N990.

The term "reinforcing inorganic filler" should be understood, in the present patent application, by definition, to mean any inorganic or mineral filler, whatever its colour and its origin (natural or synthetic), also referred to as "white filler", "clear filler", indeed even "non-black filler", in contrast to carbon black, capable of reinforcing, by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, "reinforcing inorganic filler" is also understood to mean mixtures of different reinforcing inorganic fillers, in particular of highly dispersible siliceous and/or aluminous fillers such as described hereinafter.

Mineral fillers of the siliceous type, in particular silica ($SiO_2$), or of the aluminous type, in particular alumina ($Al_2O_3$), are especially suitable as reinforcing inorganic fillers. The silica used can be any reinforcing silica known to those skilled in the art, in particular any precipitated or fumed silica having a BET surface area and also a CTAB specific surface area both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

In order to couple the reinforcing inorganic filler to the elastomer, it is possible, for example, to use, in a known way, an at least bifunctional coupling agent (or bonding agent) intended to provide a satisfactory connection, of chemical and/or physical nature, between the inorganic filler (surface of its particles) and the elastomer, in particular bifunctional organosilanes or polyorganosiloxanes.

The volume content of optional reinforcing filler in the polymer composition (carbon black and/or reinforcing inorganic filler, such as silica) is within a range extending from 0 to 30%, which corresponds approximately to a content of 0 to 100 phr for a plasticizer-free polymer composition. Preferentially, the polymer composition according to the invention comprises less than 30 phr of reinforcing filler and more preferentially less than 10 phr.

According to a preferential variant of the invention, the polymer composition does not contain reinforcing filler.

In the same way, the polymer composition according to the invention may contain one or more inert micrometric fillers, such as the platy fillers known to a person skilled in the art.

Preferably, the polymer composition according to the invention does not contain a micrometric filler.

In addition to the elastomers described above, the composition of the polymer composition could also comprise, always in a minor fraction by weight with respect to the thermoplastic elastomers, polymers other than elastomers, such as, for example, thermoplastic polymers. When they are present in the polymer composition, it is preferable for the total content of non-elastomeric thermoplastic polymers to be less than 40 phr, preferentially between 5 and 30 phr and more preferentially between 10 and 25 phr.

A further subject of the invention is a tyre comprising a polymer composition as defined above.

EXAMPLES

Determination of the distribution of molar masses by PS equivalent RI SEC

It is determined by polystyrene equivalent size exclusion chromatography (SEC). SEC makes it possible to separate macromolecules in solution according to their size through columns filled with a porous gel. The macromolecules are separated according to their hydrodynamic volume, the bulkiest being eluted first. Without being an absolute method, SEC makes it possible to comprehend the distribution of the molar masses of a polymer. The various number-average molar masses (Mn) and weight-average molar masses (Mw) can be determined from commercial standards and the polymolecularity or polydispersity index (PI=Mw/Mn) can be calculated via a "Moore" calibration.

Preparation of the polymer: There is no specific treatment of the polymer sample before analysis. The latter is simply dissolved in chloroform at a concentration of approximately 2 g/l. The solution is then filtered through a filter with a porosity of 0.45 µm before injection.

SEC analysis: The apparatus used is an Agilent 1200 chromatograph. The elution solvent is chloroform. The flow rate is 1 ml/min, the temperature of the system is 30° C. and the analytical time is 30 min. A set of three Agilent columns in series which are preceded by a filter, with commercial names "PLgel 10 µm (pre-column)" and two "PLgel 10 µm mixed B", is used. The volume of the solution of the polymer sample injected is 100 µd. The detector is an Agilent 1200 differential refractometer and the software for processing the chromatographic data is the Chemstation system. The calculated average molar masses are relative to a calibration curve produced from Agilent-KIT PS commercial polystyrene standards.

Proton Nuclear Magnetic Resonance ($^1$H NMR):

The contents of the various monomer units and their microstructures within the copolymer are determined by an NMR analysis. The spectra are acquired on a Bruker 500 MHz spectrometer equipped with a BBI Z-grad "broad band" 5 mm probe. The quantitative $^1$H NMR experiment uses a 30° single pulse sequence and a repetition time of 5 seconds between each acquisition. The samples are dissolved in $CDCl_3$. The integration zones considered for quantification are the spectral signature zones of the monomer units known to those skilled in the art.

Differential Scanning Calorimetry (DSC):
Measurement of the Tg of the Copolymers The characterization of the Tg values of the elastomer block and of the poly(alpha-methylstyrene) blocks is carried out by a DSC measurement (DSC1 instrument from Mettler Toledo). The instrument operates under a helium atmosphere. 10 to 20 mg of TPE elastomer are sampled and placed in a crucible conventionally used by those skilled in the art for carrying out Tg measurements.

The sample is first placed under isothermal conditions at +25° C. for 2 minutes and then cooled to −150° C. at a rate of 50° C. per minute. An isotherm is then applied at −150° C. for 10 minutes. First heating then starts from −150° C. to +10° C. at a rate of 20° C. per minute, and is continued from 10° C. to 250° C. at a rate of 50° C. per minute. The sample then undergoes quenching to reach −150° C. at the maximum rate permitted by the instrument. The sample is then maintained under isothermal conditions at −150° C. for 15 minutes. Second heating then starts from −150° C. to +10° C. at a rate of 20° C. per minute (range for measuring the Tg of the elastomer part of the TPE) and continues from +10° C. to +250° C. at a rate of 50° C. per minute (range for measuring the Tg of the poly(alpha-methylstyrene) blocks). In this measurement, only the second heating is processed.

Method for Measurement of the Dynamic Properties Under Strain

The dynamic properties, complex moduli G*, are measured on a viscosity analyser (Metravib DMA+450), according to standard ASTM D 5992-96. The response is recorded of a sample of desired composition (cylindrical test specimen with a thickness of 2 mm and a cross section of 78 $mm^2$), subjected to a simple alternating sinusoidal shear stress, at a frequency of 10 Hz. A sweep is carried out from −80° C. to +150° C. at a rate of 1.5°/min at a stress of 0.7 MPa.

The samples are moulded at 180° C. (diameter 25 mm, thickness 2 mm) for 5 minutes, then cut to a diameter of 10 mm with a hollow punch.

The complex modulus G* is measured.

The objective of the examples is to verify the compatibility and the selectivity of certain plasticizers used according to the invention with the elastomer phase of various thermoplastic elastomers.

The thermoplastic elastomers TPE1, TPE2 and TPE3 used are linear triblock copolymers having a poly(alpha-methylstyrene) thermoplastic block/styrene-butadiene elastomer block/poly(alpha-methylstyrene) thermoplastic block sequence. The block referred to as the central block is therefore in this macrostructure the elastomer block.

Synthesis of TPE3:

20 g of methylcylohexane, 10 g of alpha-methylstyrene and 1.25 mmol of tetrahydrofurfuryl ethyl ether are introduced into a 500 ml reactor. After neutralizing the impurities with n-butyl lithium, 0.25 mmol of s-butyl lithium are introduced. After 2 h 30 min at T=5° C., the conversion to alpha-methylstyrene measured by solids content is 70%. Analysis of the polymer by size exclusion chromatography shows the presence of a main population: Mn=20 400 g/mol.

At the end of these 2 h 30 min at 5° C., 2 g of butadiene are introduced into the reactor and then, two minutes after this addition of butadiene, a mixture containing 16.75 g of butadiene and 100 g of methylcyclohexane, the impurities of which were neutralized beforehand with n-butyl lithium, is introduced into the reactor. The reaction medium is maintained at 5° C. for 15 minutes. After these 15 minutes, the butadiene conversion is 83%.

0.12 mmol of dimethyldichlorosilane is then introduced into the reactor. The reaction medium is maintained at 5° C. for 30 minutes. The polymer obtained at the end of this coupling step is a triblock poly(apha-methylstyrene)-b-polybutadiene-b-poly(alpha-methylstyrene) polymer, which has a molar mass by SEC analysis: Mn=139 600 g/mol and 2 Tg values measured by DSC analysis: 181° C. and −25° C.

TPE1 and TPE2 are prepared according to a similar process.

The structures of the thermoplastic elastomers used according to the invention and tested are given in Tables 1 and 1a.

TABLE 1

| TPE name | % Thermoplastic (PAMS) Block | % Elastomer (SBR) Block | % STY/ Elastomer block | % 1,2-PB/ Elastomer block | % 1,4-PB Elastomer block |
|---|---|---|---|---|---|
| TPE1 | 26.6 | 73.4 | 7.9 | 76.9 | 15.2 |
| TPE2 | 30.4 | 69.6 | 0.7 | 87.8 | 11.6 |
| TPE3 | 23.9 | 76.1 | 0.8 | 80.1 | 19.1 |

TABLE 1a

| TPE name | Mn SEC (g/mol) | PI SEC (g/mol) | Tg DSC elastomer block (° C.) | Tg DSC thermoplastic block (° C.) |
|---|---|---|---|---|
| TPE1 | 113300 | 1.25 | −8 | 175 |
| TPE2 | 132400 | 1.05 | −13 | 174 |
| TPE3 | 139600 | 1.03 | −25 | 181 |

% Thermoplastic (PAMS) Block: wt % of the poly(alpha-methylstyrene) thermoplastic block in the TPE
% Elastomer (SBR) Block: wt % of the SBR elastomer block in the TPE
% STY/Elastomer block: mol % of styrene units in the elastomer block
% 1,2-PB/Elastomer block: mol % of 1,2-PB units in the elastomer block
% 1,4-PB/Elastomer block: mol % of 1,4-PB units in the elastomer block Polymer compositions are prepared comprising a thermoplastic elastomer and a plasticizer in solution. In a 5 l reactor fitted with a stirring paddle, 100 g of TPE and 20 g of plasticizer are introduced for a composition containing 20 phr of plasticizer. 2 litres of methylcyclohexane are added and the whole is stirred for 12 h. The solution is recovered and dried under vacuum or stripped with water vapour to remove the solvent.

The plasticizers used are butadiene oligomers.

The characteristics of the plasticizers used are presented in Table 2.

Table 2a shows their contents in the compositions, the glass transition temperatures of the elastomer block and of the poly(alpha-methylstyrene) thermoplastic blocks of the thermoplastic elastomers in the compositions.

Finally, Table 2a shows the complex moduli G* of the compositions.

TABLE 2

| Plasticizer name | Mn plasticizer (g/mol) | Content of 1,2-PB (%) |
|---|---|---|
| bdf 1.5 k (1) | 1530 | 15.2 |
| bdf 2.7 k (2) | 2700 | 12.9 |
| bdf 4.7 k (3) | 4700 | 10.9 |
| bdf 10 k (4) | 10000 | 7 |
| bdf 18 k (5) | 18000 | 7.7 |
| bdf 47 k (6) | 47000 | 7 |
| bdt 1.5 k (7) | 1500 | 88 |
| bdt 3.2 k (8) | 3200 | 80.4 |
| Ricon 130 (9) | 3400 | 22.9 |
| Ricon 150 (10) | 4300 | 42.1 |
| Ricon 156 (11) | 2000 | 50.3 |
| Ricon 184 (12) | 8600 | 26 |
| Polybutadiene 5 k (13) | 5300 | 14 |
| Polybutadiene 150 k (14) | 180000 | 4 |

(1) bdf 1.5 k from PSS Polymer Standards Service GmbH
(2) bdf 2.7 k from PSS Polymer Standards Service GmbH
(3) bdf 4.7 k from PSS Polymer Standards Service GmbH
(4) bdf 10 k from PSS Polymer Standards Service GmbH
(5) bdf 18 k from PSS Polymer Standards Service GmbH
(6) bdf 47 k from PSS Polymer Standards Service GmbH
(7) bdt 1.5 k from PSS Polymer Standards Service GmbH
(8) bdt 3.2 k from PSS Polymer Standards Service GmbH
(9) Ricon 130 from Cray Valley
(10) Ricon 150 from Cray Valley
(11) Ricon 156 from Cray Valley
(12) Ricon 184 from Cray Valley containing between 10 and 16 mol % of styrene
(13) Polybutadiene 5 k having an Mn of 5300 g/mol, a PI = 1.05, and having a percentage of 1,2-PB of 14 wt %
(14) Polybutadiene 150 k having an Mn of 150 000 g/mol, a PI = 1.9, and having a percentage of 1,2-PB of 4 wt %, of cis-1,4-PB of 93 wt % and of trans-1,4-PB of 3 wt %
Content of 1,2-PB: molar content of 1,2-polybutadiene units in the plasticizer TABLE 2a

| Composition | 1 | 2 | 3 | 4 | 5 | 6 | 7 | 8 | 9 | 10 | 11 | 12 |
|---|---|---|---|---|---|---|---|---|---|---|---|---|
| TPE1 | 100 | 100 | 100 | 100 | 100 | 100 | 100 | 100 | 100 | 100 | 100 | |
| TPE2 | | | | | | | | | | | | 100 |
| TPE3 | | | | | | | | | | | | |
| bdf 1.5k | | 20 | | | | | | | | | | |
| bdf 2.7k | | | 20 | | | | | | | | | |
| bdf 4.7k | | | | 20 | | | | | | | | |
| bdf 10k | | | | | 20 | | | | | | | |
| bdf18k | | | | | | 20 | | | | | | |
| bdf47k | | | | | | | 20 | | | | | |

TABLE 2a-continued

| | | | | | | | | | | | | |
|---|---|---|---|---|---|---|---|---|---|---|---|---|
| bdt 1.5k | | | | | | | 20 | | | | | |
| bdt 3.2k | | | | | | | | 20 | | | | |
| Ricon 130 | | | | | | | | | 20 | | | |
| Ricon 150 | | | | | | | | | | | | | |
| Ricon 156 | | | | | | | | | | | 20 | | |
| Ricon 184 | | | | | | | | | | | | | |
| Polybutadiene 5k | | | | | | | | | | | | | |
| Polybutadiene 150k | | | | | | | | | | | | | |
| Tg elastomer block (° C.) | −8 | −37 | −38 | −37 | −34 | −38 | −12 | −14 | −10 | −33 | −20 | −13 |
| Tg thermoplastic block (° C.) | 175 | 104 | 1301 | 144 | 160 | 163 | 167 | 145 | 158 | 136 | 136 | 174 |
| G* 40° C. (MPa) | 2.96 | | | 0.47 | | | | | | | | 5.22 |
| G*40° C. (plasticized)/G*40° C. (non-plasticized) | 1 | | | 0.16 | | | | | | | | 1 |

| Composition | 13 | 14 | 15 | 16 | 17 | 18 | 19 | 20 |
|---|---|---|---|---|---|---|---|---|
| TPE1 | | | | | | | | |
| TPE2 | 100 | 100 | 100 | | | | | |
| TPE3 | | | | 100 | 100 | 100 | 100 | 100 |
| bdf 1.5k | | | | | | | 20 | |
| bdf 2.7k | | | | | | | | |
| bdf 4.7k | | | | | | | | |
| bdf 10k | | | | | | | | |
| bdf18k | | | | | | | | |
| bdf47k | | | | | | | | |
| bdt 1.5k | | | | | | | | |
| bdt 3.2k | | | | | | | | |
| Ricon 130 | | | | | | | | |
| Ricon 150 | | 10 | 20 | | | | | |
| Ricon 156 | | | | | | | | |
| Ricon 184 | | | | | 20 | | | |
| Polybutadiene 5k | 2.0 | | | | | 20 | | |
| Polybutadiene 150k | | | | | | | | 20 |
| Tg elastomer block (° C.) | −32 | | | −25 | −24 | −45 | −36 | −28 |
| Tg thermoplastic block (° C.) | 155 | | | 181 | 161 | 158 | 160 | 166 |
| G* 40° C. (MPa) | 0.79 | 0.54 | 0.48 | 1.34 | 1.06 | 0.41 | 0.7 | 1.18 |
| G*40° C. (plasticized)/G*40° C. (non-plasticized) | 0.15 | | | 1 | 0.8 | 0.31 | 0.53 | 0.88 |

Tg elastomer block: Tg of the elastomer central block of the TPE with or without plasticizer measured by DSC
Tg thermoplastic block: Tg of thermoplastic block of the plasticized TPE measured by DSC
$G^*_{40°\,C.}$ (plasticized)/$G^*_{40°\,C.}$ (non-plasticized): G* of the plasticized TPE/G* of the TPE alone Table 2a shows that the plasticizers bdf 10k, bdf 18k, bdf 47k, bdt 3.2k and polybutadiene 5k are compatible with and selective for the elastomer phase because they significantly lower the Tg of the elastomer central block (or at the very least the Tg (non-plasticized TPE E block)−Tg (plasticized TPE E block)/((Tg (non-plasticized TPE E block)−Tg (plasticizer)) ratio is high) without lowering the Tg of the thermoplastic blocks by more than 25° C.

Moreover, the complex moduli G* show a drop in the rigidity on the compositions measured, which confirms that the plasticizers according to the invention do indeed make it possible to adjust the rigidity of the composition.

The invention claimed is:

1. A polymer composition comprising:
  (a) at least one block thermoplastic elastomer, wherein the at least one block thermoplastic elastomer is a triblock copolymer comprising a central elastomer block and a terminal thermoplastic block at each of two ends of the elastomer block, the central elastomer block predominantly comprising units derived from butadiene and further comprising units derived from one or more styrene monomers, and each of the terminal thermoplastic blocks consisting of units derived from one or more styrene monomers; and
  (b) at least one plasticizer selected from butadiene oligomers, wherein:
    (b1) a molar content of 1,2-polybutadiene units in the at least one plasticizer is within a range of from 70% to 130% of a molar content of 1,2-polybutadiene units in the at least one elastomer block of the at least one block thermoplastic elastomer, and a molar mass of the at least one plasticizer is greater than 1500 g/mol and less than 50,000 g/mol, or
    (b2) a molar content of 1,2-polybutadiene units in the at least one plasticizer is less than 70%, or greater than 130%, of a molar content of 1,2-polybutadiene units in the at least one elastomer block of the at least one block thermoplastic elastomer, and a molar mass of the at least one plasticizer is greater than 4000 g/mol and less than 50,000 g/mol.

2. The polymer composition according to claim 1, wherein the one or more styrene monomers of the central elastomer block are selected from the group consisting of styrene, o-, m- or p-methylstyrene, alpha-methylstyrene, beta-methylstyrene, 2,6-dimethylstyrene, 2,4-dimethylstyrene, alpha-methyl-o-methylstyrene, alpha-methyl-m-methylstyrene, alpha-methyl-p-methylstyrene, beta-methyl-o-methylstyrene, beta-methyl-m-methylstyrene, beta-methyl-p-methylstyrene, 2,4,6-trimethylstyrene, alpha-methyl-2,6-dimethylstyrene, alpha-methyl-2,4-dimethylstyrene, beta-methyl-2,6-dimethylstyrene, beta-methyl-2,4-dimethylstyrene, o-, m- or p-chlorostyrene, 2,6-dichlorostyrene, 2,4-dichlorostyrene, alpha-chloro-o-chlorostyrene, alpha-chloro-m-chlorostyrene, alpha-chloro-p-chlorostyrene, beta-chloro-o-chlorostyrene, beta-chloro-m-chlorostyrene, beta-chloro-p-chlorostyrene, 2,4,6-trichlorostyrene, alpha-chloro-2,6-dichlorostyrene, alpha-chloro-2,4-dichlorostyrene, beta-chloro-2,6-dichlorostyrene, beta-chloro-2,4-dichlorostyrene, o-, m- or p-butylstyrene, o-, m- or p-methoxystyrene, o-, m- or p-chloromethylstyrene, o-, m- or p-bromomethylstyrene, and styrene derivatives substituted with a silyl group.

3. The polymer composition according to claim 2, wherein the one or more styrene monomers of the central elastomer block are selected from styrene and alpha-methylstyrene.

4. The polymer composition according to claim 1, wherein the one or more styrene monomers of each of the terminal thermoplastic blocks are selected from styrene, o-, m- or p-methylstyrene, alpha-methylstyrene, beta-methylstyrene, 2,6-dimethylstyrene, 2,4-dimethylstyrene, alpha-methyl-o-methylstyrene, alpha-methyl-m-methylstyrene, alpha-methyl-p-methylstyrene, beta-methyl-o-methylstyrene, beta-methyl-m-methylstyrene, beta-methyl-p-methylstyrene, 2,4,6-trimethylstyrene, alpha-methyl-2,6-dimethylstyrene, alpha-methyl-2,4-dimethylstyrene, beta-methyl-2,6-dimethylstyrene, beta-methyl-2,4-dimethylstyrene, o-, m- or p-chlorostyrene, 2,6-dichlorostyrene, 2,4-dichlorostyrene, alpha-chloro-o-chlorostyrene, alpha-chloro-m-chlorostyrene, alpha-chloro-p-chlorostyrene, beta-chloro-o-chlorostyrene, beta-chloro-m-chlorostyrene, beta-chloro-p-chlorostyrene, 2,4,6-trichlorostyrene, alpha-chloro-2,6-dichlorostyrene, alpha-chloro-2,4-dichlorostyrene, beta-chloro-2,6-dichlorostyrene, beta-chloro-2,4-dichlorostyrene, o-, m- or p-butylstyrene, o-, m- or p-methoxystyrene, o-, m- or p-chloromethylstyrene, o-, m- or p-bromomethylstyrene, and styrene derivatives substituted with a silyl group.

5. The polymer composition according to claim 4, wherein each of the terminal thermoplastic blocks predominantly comprises units derived from the alpha-methylstyrene monomer.

6. The polymer composition according to claim 5, wherein each of the terminal thermoplastic blocks consists of units derived from the alpha-methylstyrene monomer.

7. The polymer composition according to claim 1, wherein each of the terminal thermoplastic blocks consisting of units derived from one or more styrene monomers represents at most 35% by weight, relative to a weight of the at least one thermoplastic elastomer.

8. The polymer composition according to claim 1, wherein the at least one plasticizer represents from 5 to 50 phr.

9. A tire comprising the polymer composition according to claim 1.

* * * * *